United States Patent
Hiraka et al.

(12) 
(10) Patent No.: US 6,400,377 B1
(45) Date of Patent: *Jun. 4, 2002

(54) VIDEO MONITOR ADJUSTMENT SYSTEM

(75) Inventors: Tadahiko Hiraka; Hajime Torii, both of Matto (JP)

(73) Assignee: Nanao Corporation, Matto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,108

(22) PCT Filed: Nov. 21, 1996

(86) PCT No.: PCT/JP96/03426

§ 371 (c)(1),
(2), (4) Date: Jul. 23, 1997

(87) PCT Pub. No.: WO97/19436

PCT Pub. Date: May 29, 1997

(30) Foreign Application Priority Data

Nov. 24, 1995 (JP) .............................. 7-306223

(51) Int. Cl.$^7$ ................................ G06F 9/00
(52) U.S. Cl. .................. 345/716; 345/810; 345/835
(58) Field of Search ............................ 345/347, 348, 345/146, 184, 156, 150, 810, 771, 835, 857, 716; 403/322; 348/552, 184, 189, 180, 734

(56) References Cited

U.S. PATENT DOCUMENTS

| | | | | |
|---|---|---|---|---|
| 4,092,532 A | * | 5/1978 | Hayes | 348/15 |
| 4,256,931 A | * | 3/1981 | Palisek | 200/5 A |
| 4,879,556 A | * | 11/1989 | Duimel | 348/15 |
| 5,270,821 A | * | 12/1993 | Samuels | 348/552 |
| 5,283,555 A | * | 2/1994 | Ward et al. | 345/156 |
| 5,446,480 A | * | 8/1995 | Yoshida | 345/157 |
| 5,479,191 A | * | 12/1995 | Komatsu | 345/161 |
| 5,510,810 A | * | 4/1996 | Nishijima et al. | 345/156 |
| 5,536,911 A | * | 7/1996 | Madill | 200/6 A |
| 5,550,556 A | * | 8/1996 | Wu et al. | 403/322 |
| 5,565,897 A | * | 10/1996 | Kikinis et al. | 345/213 |
| 5,589,853 A | * | 12/1996 | Fujiki | 345/150 |
| 5,594,509 A | * | 1/1997 | Florin et al. | 348/731 |
| 5,757,418 A | * | 5/1998 | Inagaki | 348/15 |
| 5,767,897 A | * | 6/1998 | Howell | 348/15 |
| 5,973,674 A | * | 10/1999 | Buecker | 345/166 |

FOREIGN PATENT DOCUMENTS

| | | |
|---|---|---|
| EP | 0 310 699 | 4/1989 |
| EP | 0 399 649 | 11/1990 |
| EP | 0 543 089 | 5/1993 |
| GB | 2 244 546 | 4/1991 |

\* cited by examiner

*Primary Examiner*—Chanh Nguyen
*Assistant Examiner*—Fritz Alphonse
(74) *Attorney, Agent, or Firm*—Oblon, Spivak, McClelland, Maier & Neustadt, P.C.

(57) ABSTRACT

Directed to an adjustment system for adjusting image quality of a video monitor by using a microprocessor, the present invention simplifies complicated operation in image quality adjustment and thereby eliminates the need for high-level operating skills. The adjustment system comprises an on-screen display controller circuit which can display a plurality of adjustment items in the form of icons together with a visual message, explaining the content of each icon, on a screen of the video monitor and an input device used for selecting a desired icon and setting a corresponding parameter, the input device being constructed of four-way input switches which are integrally combined into a single button to perform adjustment functions. This construction enables an operator to perform adjustment operations in an integrated manner which have thus far been made individually, providing savings in the period of time required for adjustment work and simplification thereof.

18 Claims, 14 Drawing Sheets

<PICTURE ADJUSTMENT>

<CONTRAST/BRIGHTNESS>

FIG. 14

| NO. | ADJUSTMENT ITEM | IP=0 | IP=1 | IP=2 | IP=3 | REMARKS |
|---|---|---|---|---|---|---|
| 1 | CONTRAST/BRIGHTNESS | ◐ | ● | ☼ | ☼ | FIG. 15A |
| 2 | HORIZONTAL SIZE/VERTICAL SIZE | ↕ | ↑↓ | ↔ | →← | FIG. 15B |
| 3 | HORIZONTAL POSITION/VERTICAL POSITION | □ | □ | □ | □ | FIG. 15C |
| 4 | HORIZONTAL SIZE/HORIZONTAL POSITION | ↔ | ↔ | ↔ | ↓↑ | |
| 5 | VERTICAL SIZE/VERTICAL POSITION | | | | | |
| 6 | PINCUSHION BALANCE/PINCUSHION DISTORTION | ⊃⊂ | ⊂⊃ | ◯ | )( | FIG. 15D |
| 7 | PARALLELOGRAM DISTORTION/TRAPEZOIDAL DISTORTION | ▱ | ▱ | ▱ | ▱ | FIG. 15E |
| 8 | PINCUSHION DISTORTION/TRAPEZOIDAL DISTORTION | ⊃ | ⊂ | ▱ | ▱ | |
| 9 | PINCUSHION BALANCE/PARALLELOGRAM DISTORTION | | | | | |
| 10 | HORIZONTAL CONVERGENCE/VERTICAL CONVERGENCE | ≡ | ≡ | ≡ | ≡ | FIG. 15G |
| 11 | HORIZONTAL MOIRE CORRECTION/VERTICAL MOIRE CORRECTION | ≪ | ≪ | ≪ | ≪ | FIG. 15H |
| 12 | VERTICAL LINEARITY/VERTICAL LINEARITY BALANCE | ▮ | ▮ | ▮ | ▮ | |
| 13 | TOP CORNER DISTORTION/TOP CORNER DISTORTION BALANCE | □ | □ | □ | □ | |
| 14 | BOTTOM CORNER DISTORTION/BOTTOM CORNER DISTORTION BALANCE | | | | | |
| 15 | TILT | ▱ | ▱ | ▱ | ▱ | FIG. 15F |

VIDEO MONITOR ADJUSTMENT SYSTEM

TECHNICAL FIELD OF THE INVENTION

The present invention pertains generally to a video monitor connected to various computer systems and, more particularly, relates to an adjustment system for the video monitor which can perform image quality adjustment operation by using a microprocessor to ensure an optimum image quality when connected to a computer system.

BACKGROUND TECHNOLOGY

A microprocessor-controlled video monitor which can automatically adjust image quality adjustment parameters in accordance with the operation of different computer systems is conventionally known in the art (Japanese Unexamined Patent Publication No. 3-35287).

To maintain an optimum image quality, the video monitor of this kind is so constructed that operating parameters of its individual circuits, such as a video amplifier circuit, a vertical deflection circuit and a horizontal deflection circuit, are set to match a computer system to which the video monitor is connected. A control processor performs image quality adjustments by setting specific parameters of the video monitor through a digital-to-analog (D/A) converter.

Specific parameter settings suitable for various computer systems are readily stored in a nonvolatile memory in the aforementioned conventional video monitor. The control processor reads parameter settings suited to the computer system connected to the video monitor from the nonvolatile memory and alters, or corrects, current parameter settings.

The aforementioned video monitor also allows manual adjustment of the individual parameters. To make this possible, the video monitor is provided with a plurality of icons representative of the adjustable parameters, associated with correspondingly arranged light-emitting diodes and input switches for user inputting.

The conventional video monitor thus constructed enables an operator to recognize a selected icon by lighting a corresponding light-emitting diode. One drawback of this arrangement is that the operator can not perform adjustment operation unless he, or she, is fully aware of the content of each icon and skilled in every adjustment procedure. Another drawback of the conventional arrangement is that the operator can not carry out adjustments while observing a displayed image. This is because the operator is allowed to set a parameter corresponding to each selected icon only in one direction, a positive-going direction only for contrast adjustment, for example, in a single adjusting action, and input switches for incrementing and decrementing the setting of each parameter are provided independently of each other, requiring successive operations. The image quality adjustment operation has therefore been complicated and taking a lot of time.

This invention has been made in the light of the aforementioned problems of prior art technology. Accordingly, it is a principal object of the invention to provide a video monitor adjustment system which significantly simplifies adjustment operation by allowing an operator to perform a fingertip operation in an integrated manner while observing an on-screen display.

DISCLOSURE OF THE INVENTION

A video monitor adjustment system which has achieved the aforementioned object of the invention is characterized in that it comprises an on-screen display controller circuit which displays a plurality of adjustment items in the form of icons on a display screen of a video monitor, an input device used for selecting one of the icons displayed on the screen and setting a parameter corresponding to the selected icon, the input device including an operating element into which four-way input switches for specifying upward, downward, leftward and rightward directions and an input confirmation switch are integrally incorporated, and a image quality controller which identifies a selected adjustment item based on an icon selection command entered through the input device and adjusts image quality adjustment parameters of the video monitor in accordance with parameter setting operation.

In this invention, the aforesaid input device may be constructed in such a way that the four-way input switches and the input confirmation switch are operated by using a common operating switch panel. Alternatively, the aforesaid input device may be constructed in such a way that the four-way input switches are operated by using a common operating switch panel and the input confirmation switch is operated by using another operating element.

The aforesaid on-screen display controller circuit may also display the content of each icon at the same time in the form of a visual message.

The aforesaid four-way input switches may be divided into two groups, one group including switches usable for incrementing or decrementing the setting of one of two parameters, and the other group including keys invalid.

The aforesaid image quality controller and on-screen display circuit may work together to display a plurality of icons used for parameter setting based on a time-division scheme. Furthermore, a plurality of icons used for parameter setting may be displayed all together for each adjustment item. It is preferable that the icons displayed together individually correspond to the four-way input switches, and an icon selected from the icons displayed together be emphasized in its appearance for ease of identification.

According to the invention, a microprocessor serving as the image quality controller transmits adjustment signals to such circuits as a video amplifier circuit, a vertical deflection circuit and a horizontal deflection circuit via a D/A converter of the video monitor upon receiving a command entered through the input device and adjusts parameters of the individual circuits.

The adjustment items include brightness, contrast, horizontal size, horizontal position, vertical size, vertical position, pincushion distortion, pincushion balance, trapezoidal distortion, parallelogram distortion, horizontal convergence, vertical convergence, horizontal moire correction, vertical moire correction, vertical linearity, vertical linearity balance, top and bottom corner distortions, top and bottom corner distortion balances, and tilt, for example.

The microprocessor can overlay a message explaining each adjustment item on the screen of the video monitor through the on-screen display circuit. The message appears on the screen for each individual adjustment item, providing an appropriate instruction to an operator. Since an input signal is externally entered through an input terminal of the video monitor at this time, an image used for adjustment operation, such as a crosshatch pattern, is also displayed on the screen. Therefore, the message is overlaid on the image used for adjustment.

On-screen messages may include in their contents any graphical symbols including icons in addition to an arbitrary character string. Each message may be presented with each character surrounded with a frame, or individual characters may be displayed without special circumscription.

A combination of the four-way input switches and the input confirmation switch enables convenient operation; the four-way input switches may be used for selecting adjustment items and for incrementing and decrementing parameter settings, while the input confirmation switch may be used for setting the selected adjustment item and the adjusted parameter. When the four-way input switches are used in this way, upward and rightward directions may be used for incrementing operation, and downward and leftward directions for decrementing operation. With this arrangement, a selected parameter can be varied on a real-time basis through the microprocessor in accordance with the duration of time each switch is held pressed.

If the input confirmation switch is pressed when an optimum image quality has been achieved, the microprocessor writes the value of the selected parameter at that moment into a nonvolatile memory to preserve it.

If the input device is an operating switch unit into which the four-way input switches and the input confirmation switch are integrally incorporated, the operator can selectively operate the four-way input switches and the input confirmation switch only by slightly changing his, or her, switch pressing position. This enables the operator to complete each adjustment sequence while observing the screen of the video monitor,-without having to look at the operating switch unit. It is preferable that the operating switch unit operated in this manner have a physical size that is suitable for a fingertip adjustment, and projecting markings corresponding to the four-way input switches and the input confirmation switch be formed on its surface.

If the input device is divided into two operating switch units, one combining the four-way input switches and the other incorporating the input confirmation switch, the operator can adjust the image quality with his, or her, both hands, using a fingertip of the left hand to manipulate one operating switch unit and a fingertip of the right hand to manipulate the other operating switch unit.

If the four-way input switches are divided into two groups, each for incrementing or decrementing the settings of two parameters, it would become possible to adjust two closely interrelated parameters at the same time, and adjustment operation can be performed more quickly. Specifically, the two closely interrelated parameters may be contrast and brightness, horizontal size and vertical size, horizontal position and vertical position, pincushion balance and pincushion distortion, parallelogram distortion and trapezoidal distortion, horizontal convergence and vertical convergence, horizontal moire correction and vertical moire correction, for example. It will be recognized from these examples that it is possible to combine parameters which are often adjusted interdependently in ordinary adjustment work as well as those parameters which can be combined with each other based on their conceptual similarity.

In this case, the microprocessor can make it even easier to select a desired adjustment item from those shown on a submenu window by presenting icons, which prompt the operator to increment or decrement the settings of the two parameters, at the same position within the submenu window based on a time-division scheme. Since the selected adjustment item, or icons corresponding to that adjustment item, are alternately displayed with the lapse of time, the operator can intuitively recognize the content of adjustment and carry out the operation.

Alternatively, the microprocessor may simultaneously display functions of the individual directional input switches by presenting all icons, corresponding to incrementing and decrementing operations of the two parameters, on an adjustment screen at the same time, rather than presenting them based on a time-division scheme. More particularly, icons corresponding to the incrementing and decrementing operations of the two parameters may be displayed at top, bottom, left and right positions on the screen so that they correspond to the incrementing and decrementing functions of the four-way input switches, and an icon corresponding to a directional input switch pressed by the operator may be emphasized in its appearance, for instance. This arrangement would enable the operator to distinctly recognize the content of each operation. Preferably, the icon should be emphasized by showing it in an inverted video, or temporarily surrounding it by a box or underscoring it. This is because a video emphasis technique of this kind is effective for saving the capacity of the nonvolatile memory, when compared to a method of displaying a completely different icon.

According to the invention, it is possible to present the individual adjustment items on the screen of the video monitor to allow the operator to select a desired adjustment item, as well as messages necessary for carrying out parameter setting and other adjustment operations on the same screen. This permits the operator to easily adjust the image quality within a short period of time. Moreover, the integrated four-way input switches make it possible to perform the adjustment operations without looking at the fingertips and to increment or decrement the settings of two parameters at the same time. This provides such advantageous effects that operator input efficiency is significantly improved, and this enables the operator to execute adjustment work in a reliable and efficient manner.

BRIEF DESCRIPTION OF THE DRAWINGS

FIG. 14 is a table showing a listing of adjustment items and corresponding icons.

BEST MODES FOR CARRYING OUT THE INVENTION

A specific embodiment of the invention is now described with reference to the accompanying drawings.

Figure 1:
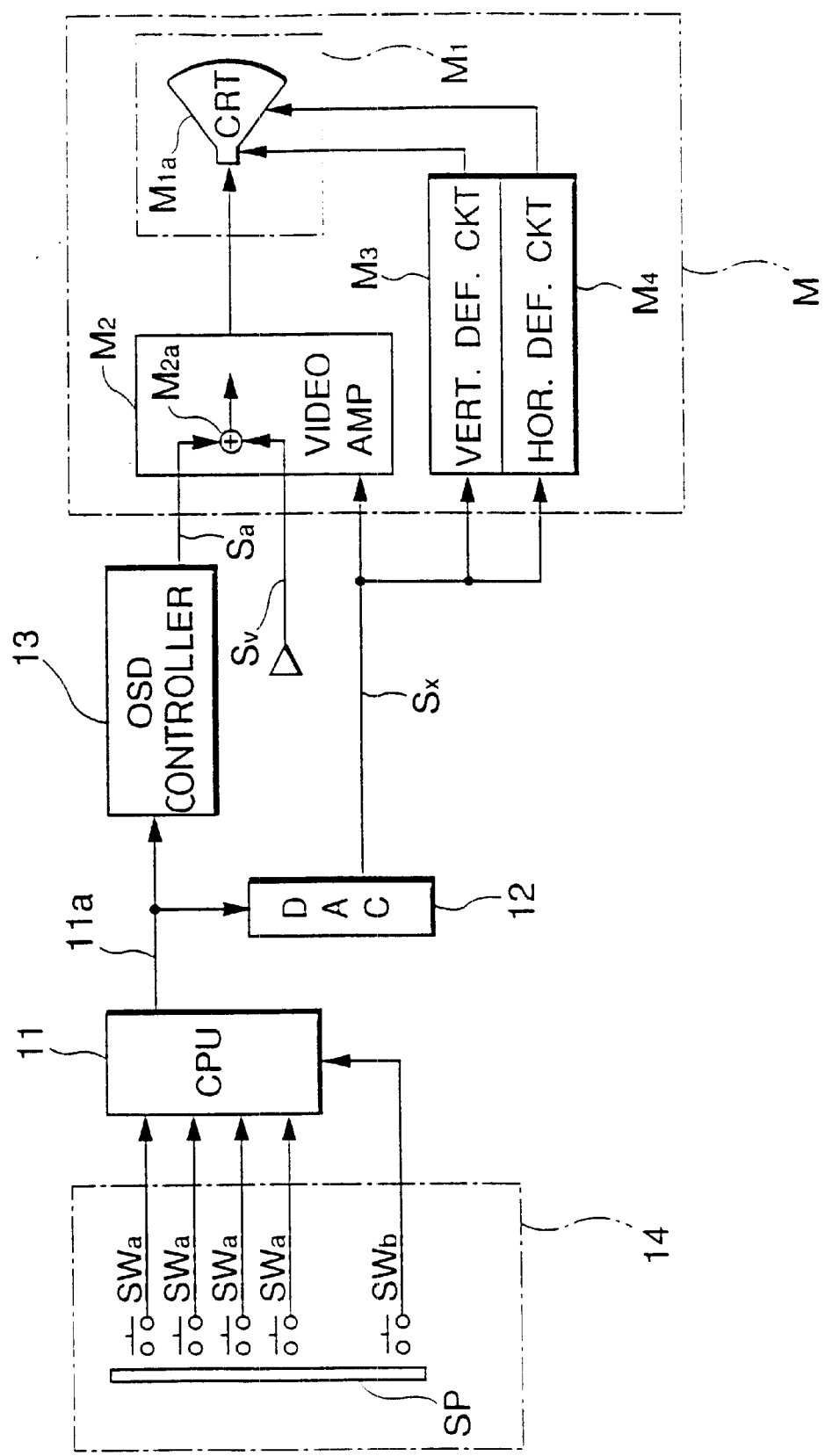
FIG. 1 is a block diagram showing a general configuration of a video monitor adjustment system according to the invention.

Referring to FIG. 1, a video monitor adjustment system mainly comprises an on-screen display controller circuit 13 which displays a plurality of adjustment items in the form of icons together with a visual message explaining the content of each icon on a display screen of a video monitor, an operating switch unit 14 used as an input device for selecting a desired icon displayed on the screen and setting a parameter corresponding to the selected icon, the operating switch unit 14 including an operating element into which four-way input switches for specifying upward, downward, leftward and rightward directions and an input confirmation switch are integrally incorporated, and a microprocessor 11 serving as a image quality controller which identifies a selected adjustment item based on an icon selection command entered through the operating switch unit 14 and adjusts image quality adjustment parameters of the video monitor via a D/A converter 12 in accordance with parameter setting operation.

The video monitor M comprises a display section M1 including a color CRT display M1a (hereinafter simply referred to as a CRT) as well as a video amplifier circuit M2, a vertical deflection circuit M3 and a horizontal deflection circuit M4. The video amplifier circuit M2 incorporates a mixer M2a for mixing an externally entered video signal Sv and a video signal Sa fed from the on-screen display controller circuit 13 and outputting a mixed signal.

Figure 2:
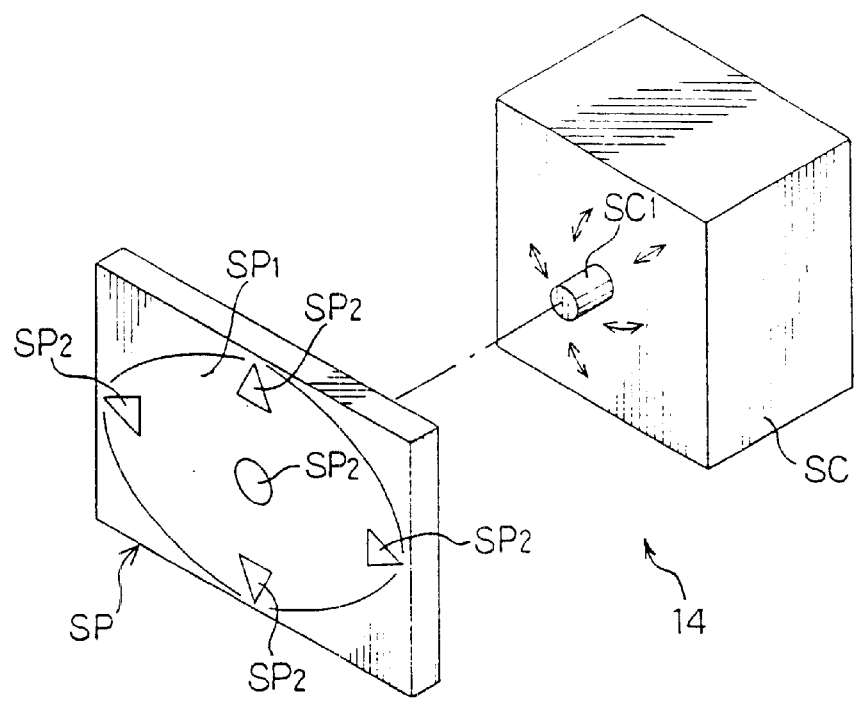
FIG. 2 is an exploded perspective view of an input operation block shown in FIG. 1.

The operating switch unit 14 includes the four-way input switches SWa for specifying upward, downward, leftward and rightward directions and the input confirmation switches SWb, and output terminals of the four-way input switches SWa and the input confirmation switch SWb are individually connected to the microprocessor 11. This arrangement allows an operator to perform adjustment operations in an integrated way by using a common operating switch panel SP shown in FIG. 2.

More specifically, the directional input switches SWa and the input confirmation switch SWb are housed in a case SC. Each of the directional input switches SWa can be operated independently of one another by slightly tilting a movable shaft SC1, projecting from one side surface of the case SC, upward, downward, leftward or rightward, and the input confirmation switch SWb can be activated by pushing the movable shaft SC1 inward in its axial direction (as shown by arrows in FIG. 2).

Figure 3:
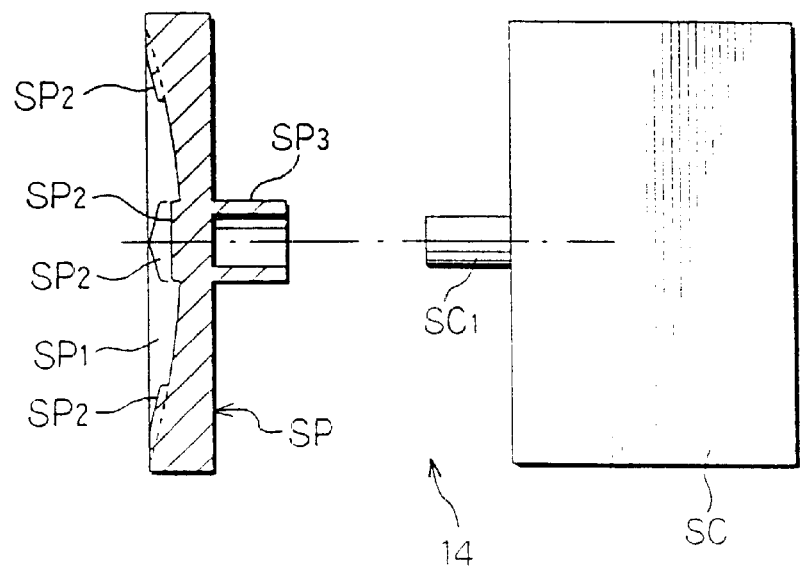
FIG. 3 is a vertical cross-sectional view of the input operation block shown in FIG. 2.

The operating switch panel SP has a size just suited for a fingertip operation and has a shallow depression SP1 in its front surface as shown in FIG. 3. A plurality of markings SP2 are formed in projecting triangular and circular shapes in the depression SP1 to indicate operating positions of the individual directional input switches Swa and the input confirmation switch SWb. In addition, a tubular part SP3 for press-fitting over the movable shaft SC1 is formed on the back of the operating switch panel SP.

Referring again to FIG. 1, both the D/A converter 12 and the on-screen display controller circuit 13 are connected to an output bus 11a of the microprocessor 11, and outputs of the D/A converter 12 are individually connected to the video amplifier circuit M2, the vertical deflection circuit M3 and the horizontal deflection circuit M4 in the video monitor M. It is to be noted that the D/A converter 12 is of a multi-channel type which is selectively operated in accordance with addresses specified by the microprocessor 11. The outputs of the D/A converter 12 are assigned to specific channels depending on types of parameters entered to the individual input circuits of the video monitor M. These outputs are transmitted as separate adjustment signals Sx to the individual input circuits.

In this embodiment, the microprocessor 11, the D/A converter 12 and the on-screen display controller circuit 13 are integrally incorporated into the video monitor M. Preferably, the operating switch unit 14 should be installed in a position where the operator can easily operate it, for example, just beneath the display screen on an unillustrated front panel of the video monitor M.

When the externally entered video signal Sv is fed into the video amplifier circuit M2 in the above configuration, a specific adjustment image is displayed on the screen of the CRT M1a of the video monitor M. The video signal Sv is, for example, a signal for producing a so-called crosshatch pattern composed of intersecting parallel white lines on black background that is used for adjusting the video monitor M by operating the adjustment system including the microprocessor 11.

Figure 4:
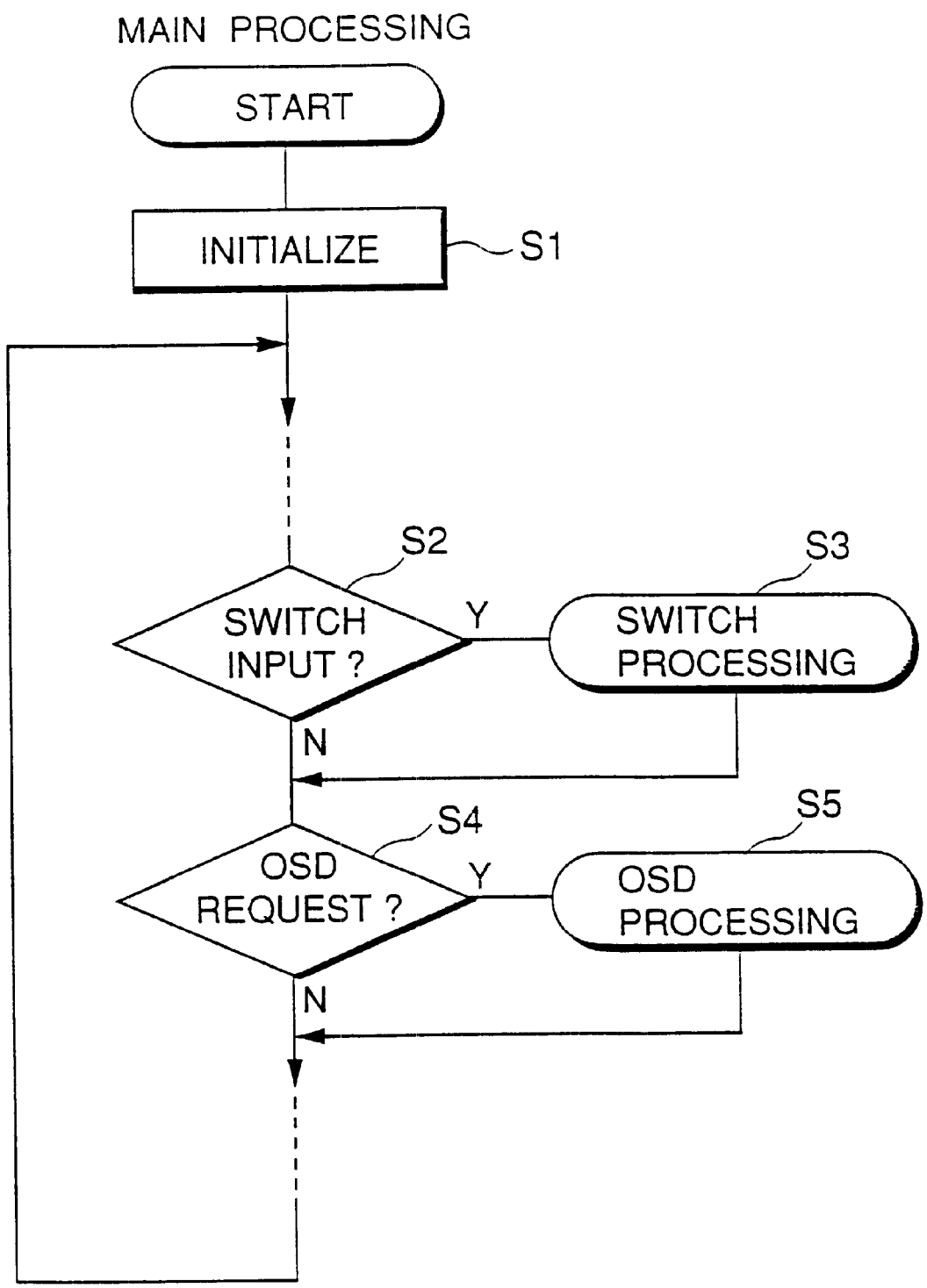
FIG. 4 is a flowchart showing a main (adjustment) processing routine according to the invention.

The microprocessor 11 is activated just when the video monitor M is powered on, and runs a main processing routine which is shown in FIG. 4. More particularly, the microprocessor 11 performs system initialization (Step S1, which may be hereinafter simply referred to as S1) and waits for a depression of the input confirmation switch SWb or a message display request from other program routines (Steps S2 to S5).

Figure 5:
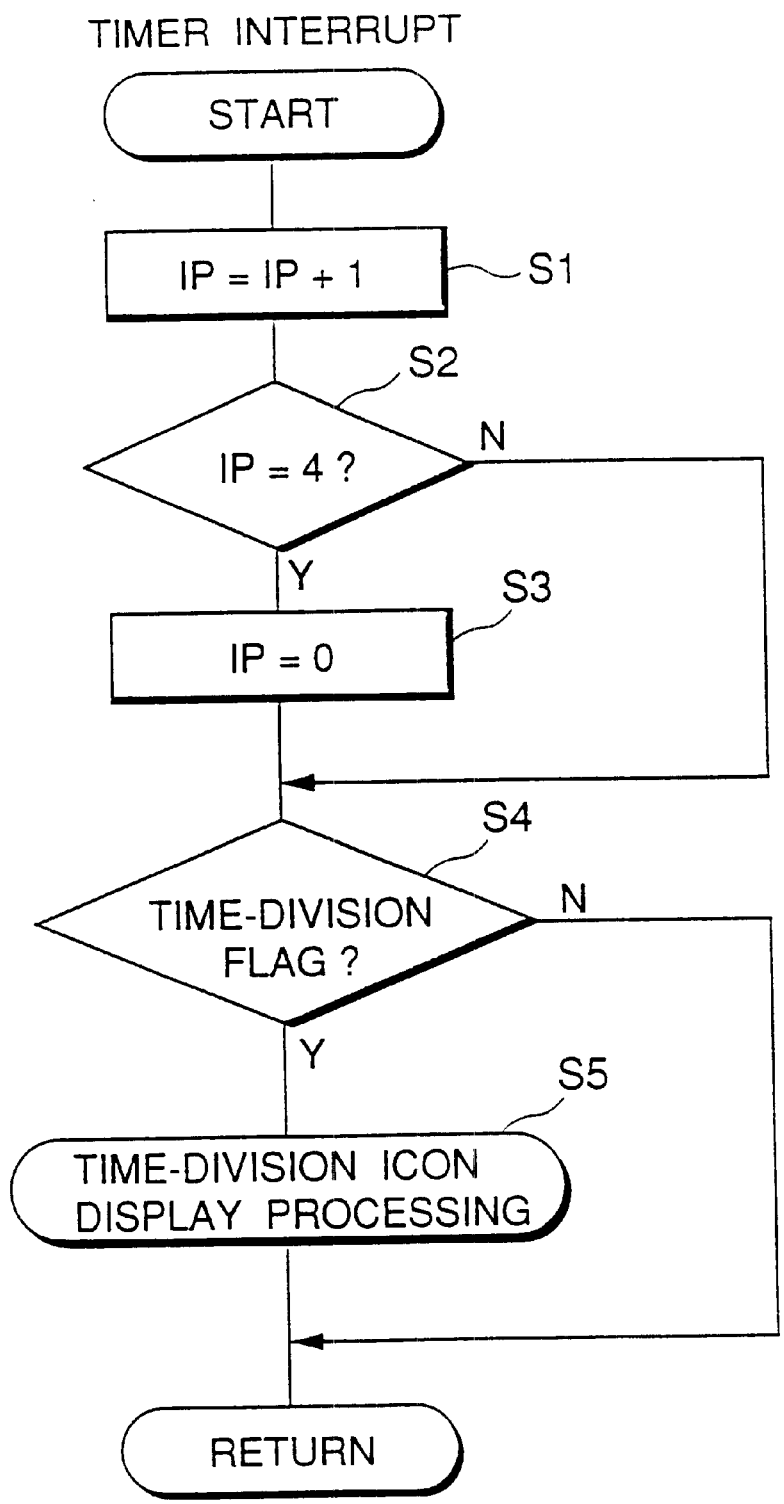
FIG. 5 is a flowchart showing a timer interrupt routine performed in the main processing routine.

The microprocessor 11 also initiates a timer interrupt routine shown in FIG. 5 immediately upon power-on. Specifically, the microprocessor 11 initiates the timer interrupt routine at 0.5-second intervals, for example, by using a timer which operates with a built-in counter, and cyclically updates icon pattern IP from 0 to 4 (Steps S1 to S3). The microprocessor 11 executes a time-division icon display processing routine (Step S5) each time a time-division flag is set (Step S4).

The icon pattern IP is initially set to "IP=0" in Step S1 shown in FIG. 4.

The operator pushes the center SP2 of the operating switch panel SP to press in the input confirmation switch SWb of the operating switch unit 14 when he or she makes the microprocessor 11 execute an adjustment function. In this case, it is judged that a "switch input" has been made in Step S2 of FIG. 4 and, then, a switch processing routine shown in FIG. 6 commences (Step S3).

Figure 6:
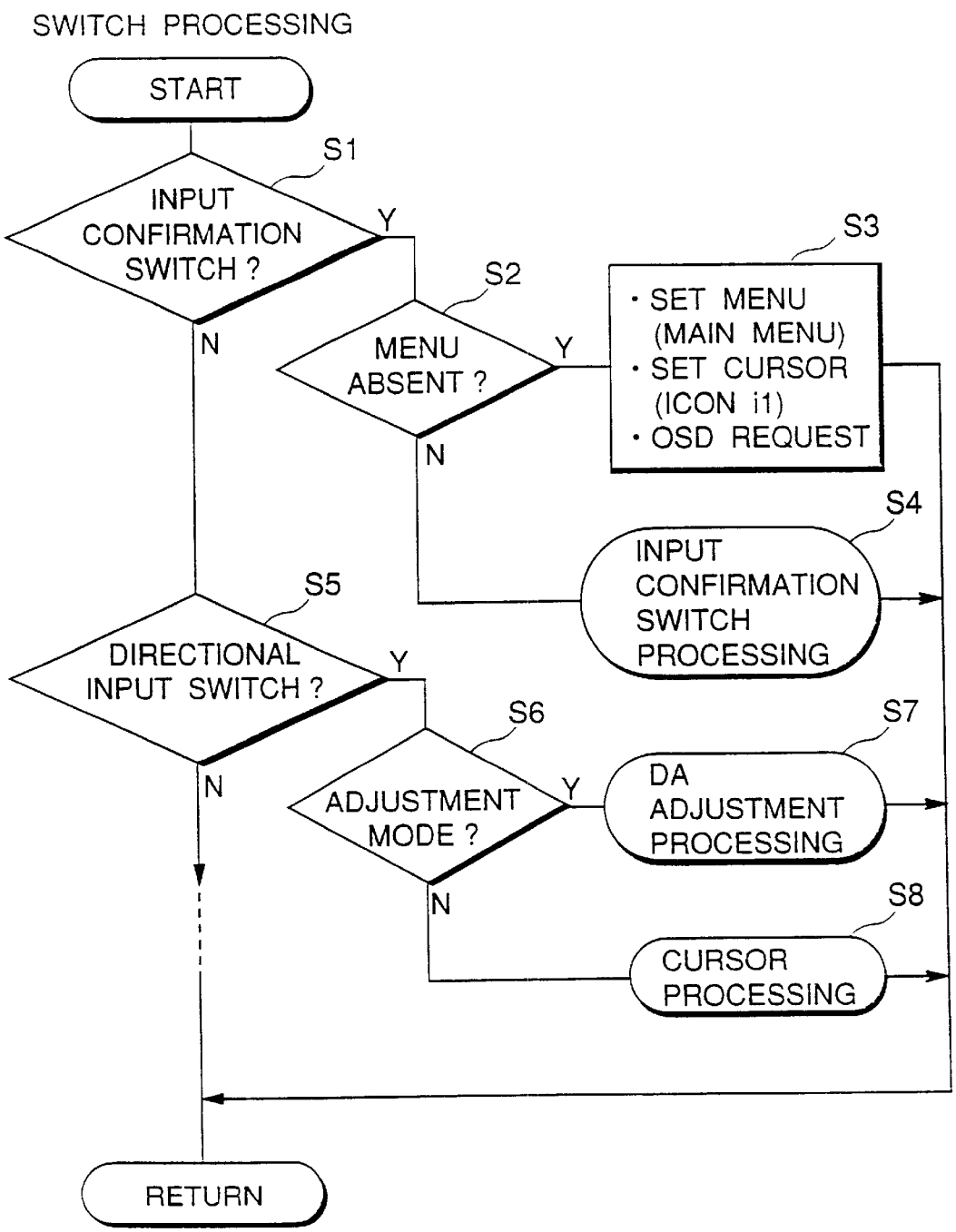
FIG. 6 is a flowchart showing a switch processing routine.
Figure 13A:
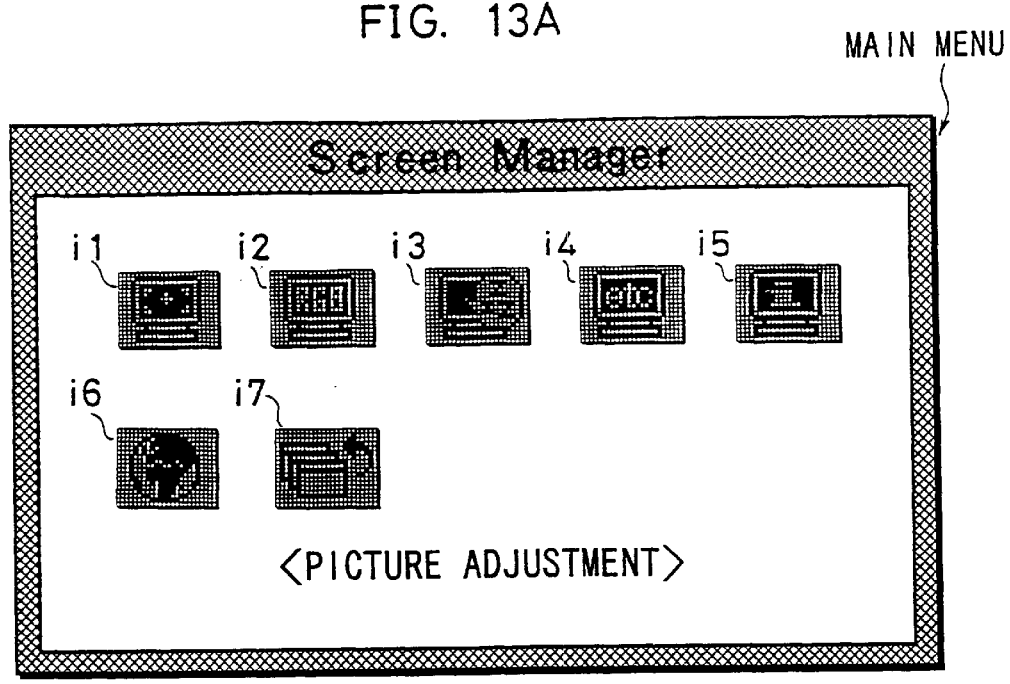
FIGS. 13A and 13B are diagrams showing an on-screen menu window and a hierarchical submenu window.

Referring to FIG. 6, no menu is displayed (Step S2) in the beginning when it is judged that the input confirmation switch SWb has been pressed (Step S1). The main menu window labeled "Screen Manager" is displayed on the screen with a cursor located at a first icon shown within the main menu window, and a message display request is transmitted to the on-screen display controller circuit 13 (Step S3). This display request is detected in Step 4 of the main processing routine shown in FIG. 4 and, then, on-screen display (OSD) processing of Step 5, or Steps S1, S3 and S4 of an OSD processing routine shown in FIG. 7, is performed so that the main menu window is displayed on the CRT M1a (see FIG. 13A).

Figure 7:
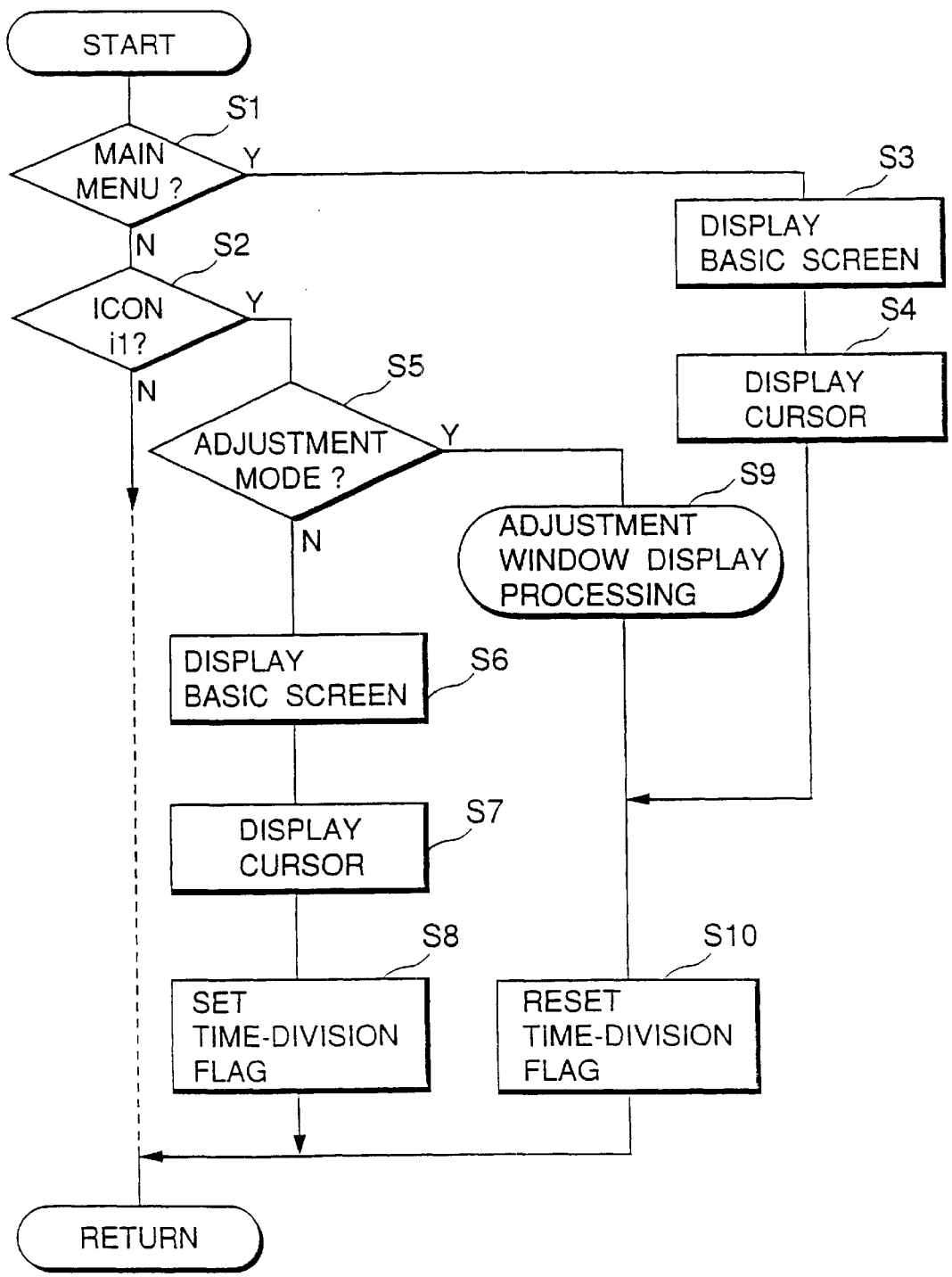
FIG. 7 is a flowchart showing an OSD processing routine.

Since the cursor is positioned at icon i1 in Step S3 of FIG. 6, icon i1 is shown in an inverted video (Step S4 of FIG. 7). The message "Image Adjustment" showing the content of adjustment corresponding to icon i1 is displayed at the same time at the bottom of the main menu window.

When any one of the directional input switches SWa is pressed in this condition, it is judged in the main processing routine of FIG. 4 that a "switch input" has been made (Step S2) and, then, the switch processing routine begins (Step S3). In the key processing routine, as shown in FIG. 6, it is verified that adjustment mode has not been activated although a directional input switch SWa has been pressed (Steps S1, S5 and S6) and, then, a cursor processing routine is performed (Step S8).

Figure 8:
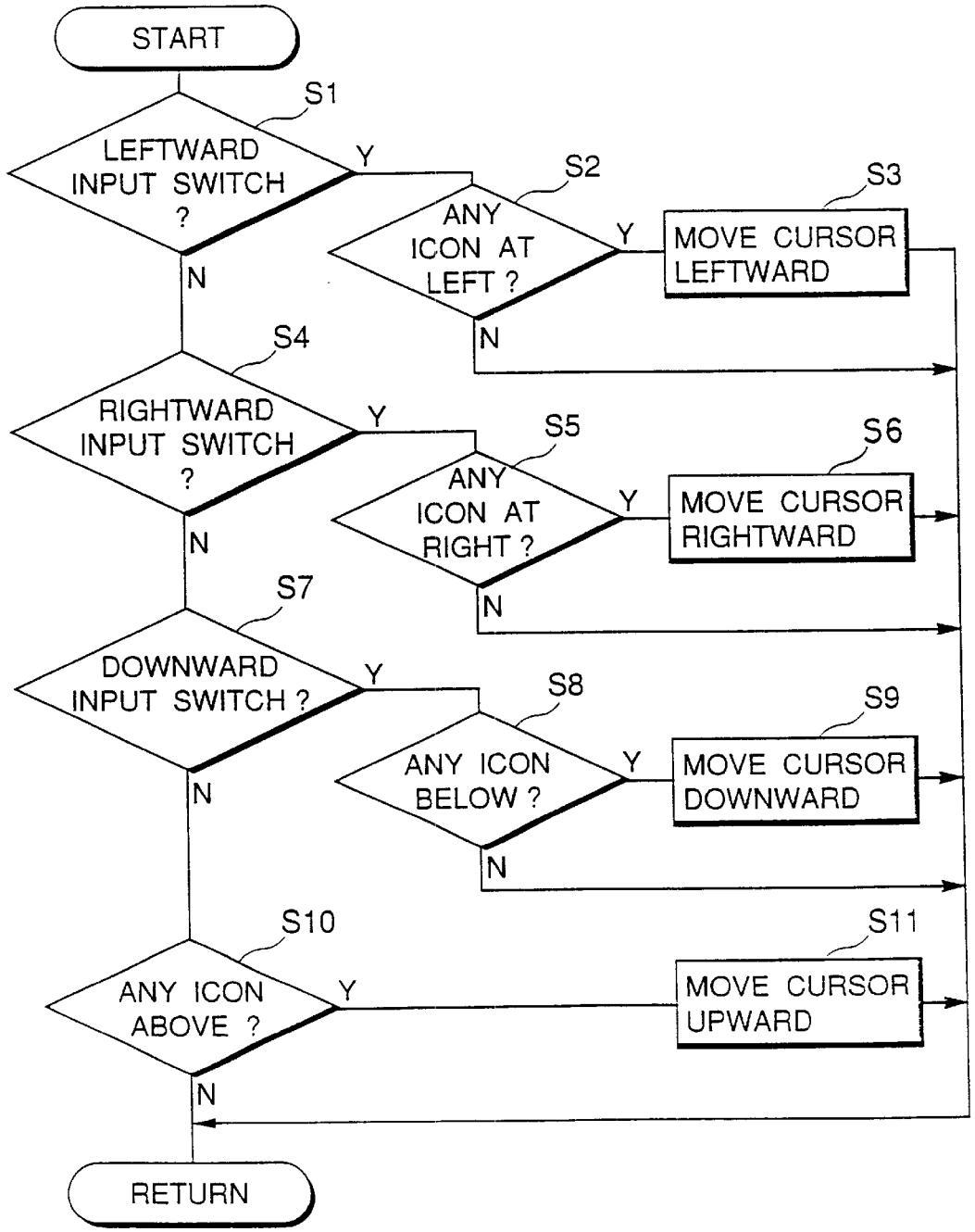
FIG. 8 is a flowchart showing a cursor processing routine.

Referring to FIG. 8, the cursor processing routine enables the operator to move the cursor on the main menu window in a direction corresponding to the directional input switch SWa pressed. Therefore, the operator can select a desired icon within the main menu window, proceeding from Step S1 to Step S3, from Step S4 to Step S6, from Step S7 to Step S9, or from Step S10 to Step S11. The message displayed at the bottom of the main menu window during the cursor processing routine is altered in accordance with the movement of the cursor.

Figure 9:
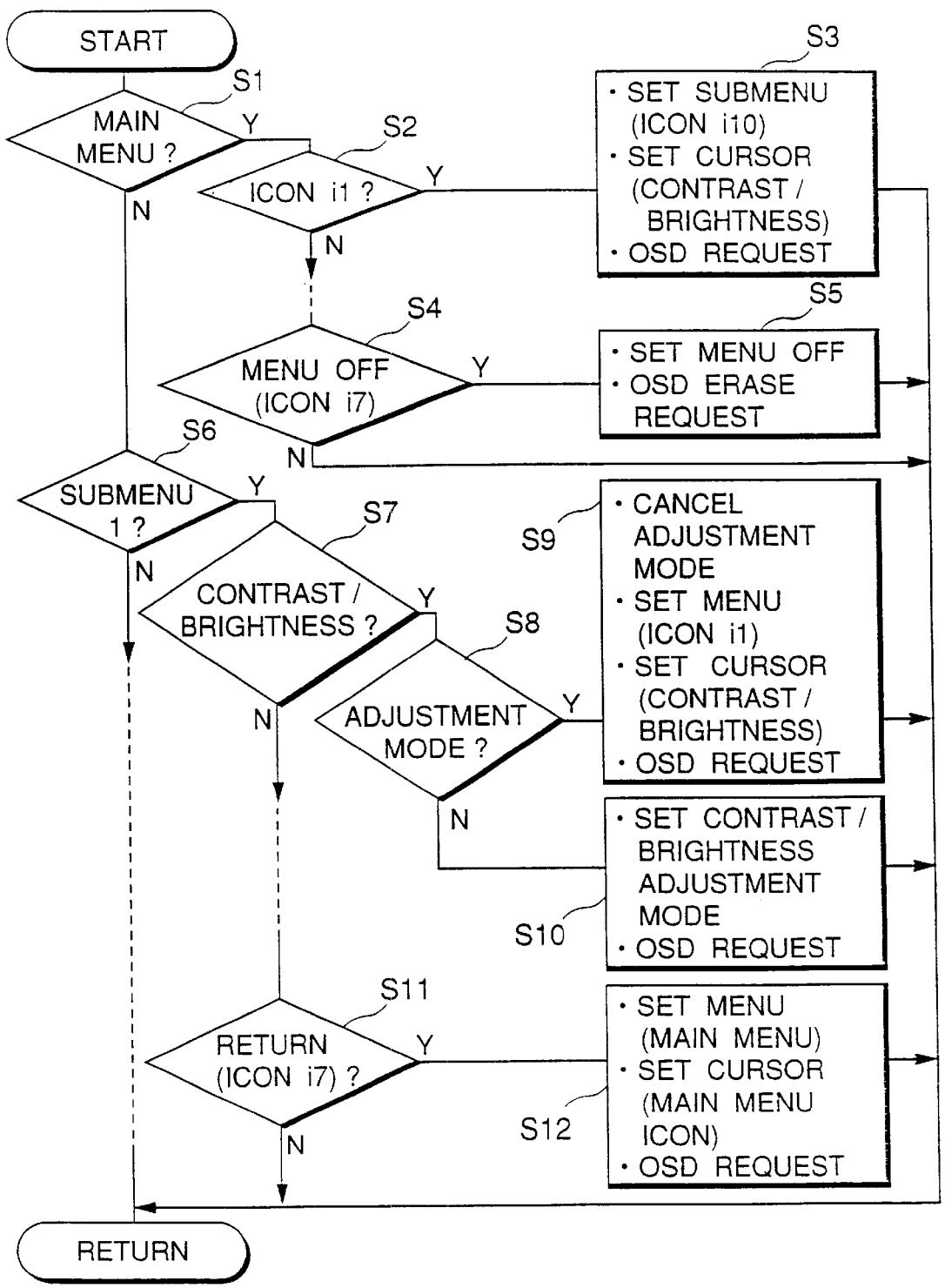
FIG. 9 is a flowchart showing an input confirmation switch processing routine.

As an example, if the input confirmation switch SWb is pressed after selecting icon i1 on the main menu in the aforementioned manner, the operation flow proceeds to the switch processing routine of FIG. 6 by way of Steps S2 and S3 of FIG. 4 in a similar way as described above and, then, an input confirmation switch processing routine shown in FIG. 9 commences by way of Steps S1 and S2 of FIG. 6.

The input confirmation switch processing routine proceeds through its Steps S1 and S2, selects the submenu labeled "Image Adjustment" corresponding to icon i1, and issues a message display request (Step S3). Upon receiving this message display request, the microprocessor 11 executes Steps S4 and S5 of FIG. 4 and initiates the OSD processing routine shown in FIG. 7.

Figure 13B:
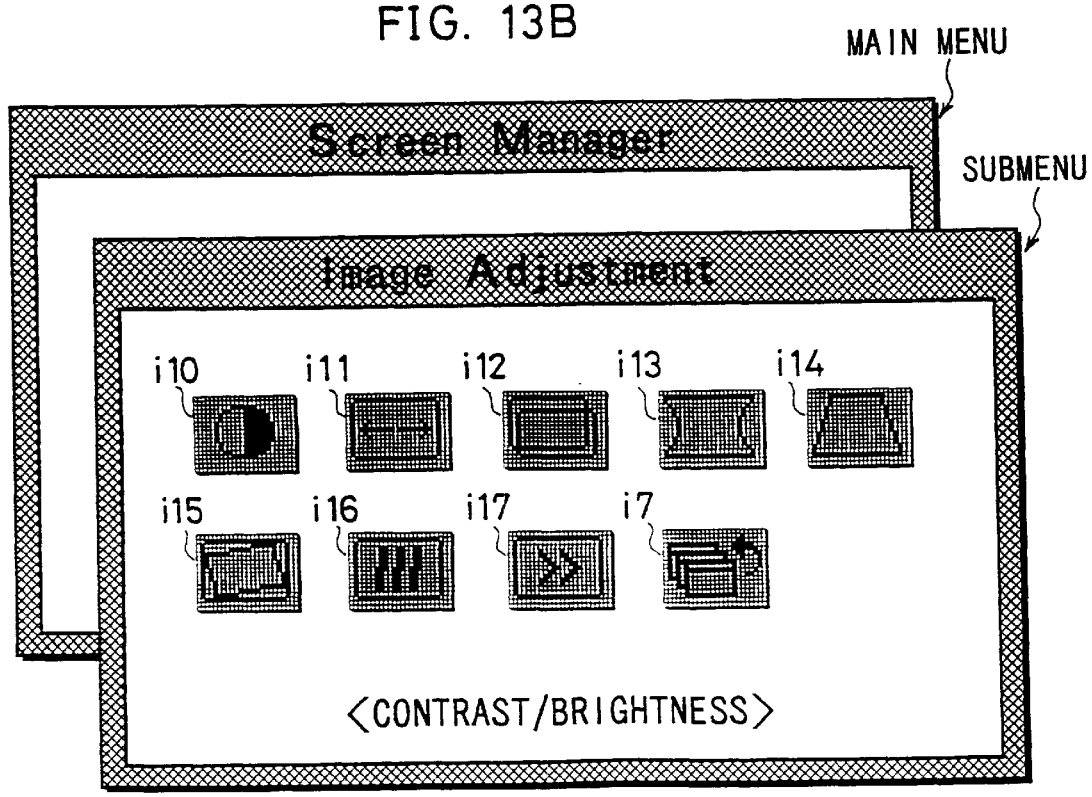

The OSD processing routine proceeds through its Steps S1, S2 and S5, and displays a submenu window corresponding to icon i1 on the screen of the CRT M1a (Steps S6 and S7; see FIG. 13B).

Since the cursor within the submenu window is positioned at the first adjustment item labeled "Contrast/Brightness" in Step S3 of FIG. 9, icon i10 representative of "Contrast/Brightness" is shown in an inverted video. A message explaining the content of adjustment corresponding to icon i10 is displayed at the same time at the bottom of the submenu window.

When any one of the directional input switches SWa is pressed in this condition, the switch processing routine is commenced by way of Steps S2 and S3 of the main processing routine shown in FIG. 4, and the cursor processing routine of FIG. 8 is initiated by way of Steps S1, S5 and S6 of FIG. 6 in exactly the same manner as described above. The cursor processing routine executed in this case enables the operator to select a desired adjustment item within the submenu window by pressing the directional input switches SWa.

In the submenu window shown in FIG. 13B, icon i10 represents adjustment item "Contrast/Brightness", icon i11 represents adjustment item "Horizontal Size/Vertical Size", icon i12 represents adjustment item "Horizontal Position/Vertical Position", icon i13 represents adjustment item "Pincushion Balance/Pincushion Distortion", icon i14 represents adjustment item "Parallelogram Distortion/Trapezoidal Distortion", icon i15 represents adjustment item "Tilt", icon i16 represents adjustment item "Horizontal Convergence/Vertical Convergence", and icon i17 represents adjustment item "Horizontal Moire Correction/Vertical Moire Correction". Icon i7 represents a return key.

An icon selected by the cursor which skips from one icon to another is shown in an inverted video, and a message explaining the content of adjustment corresponding to the selected icon is displayed at the same time at the bottom of the submenu window.

Figure 10:
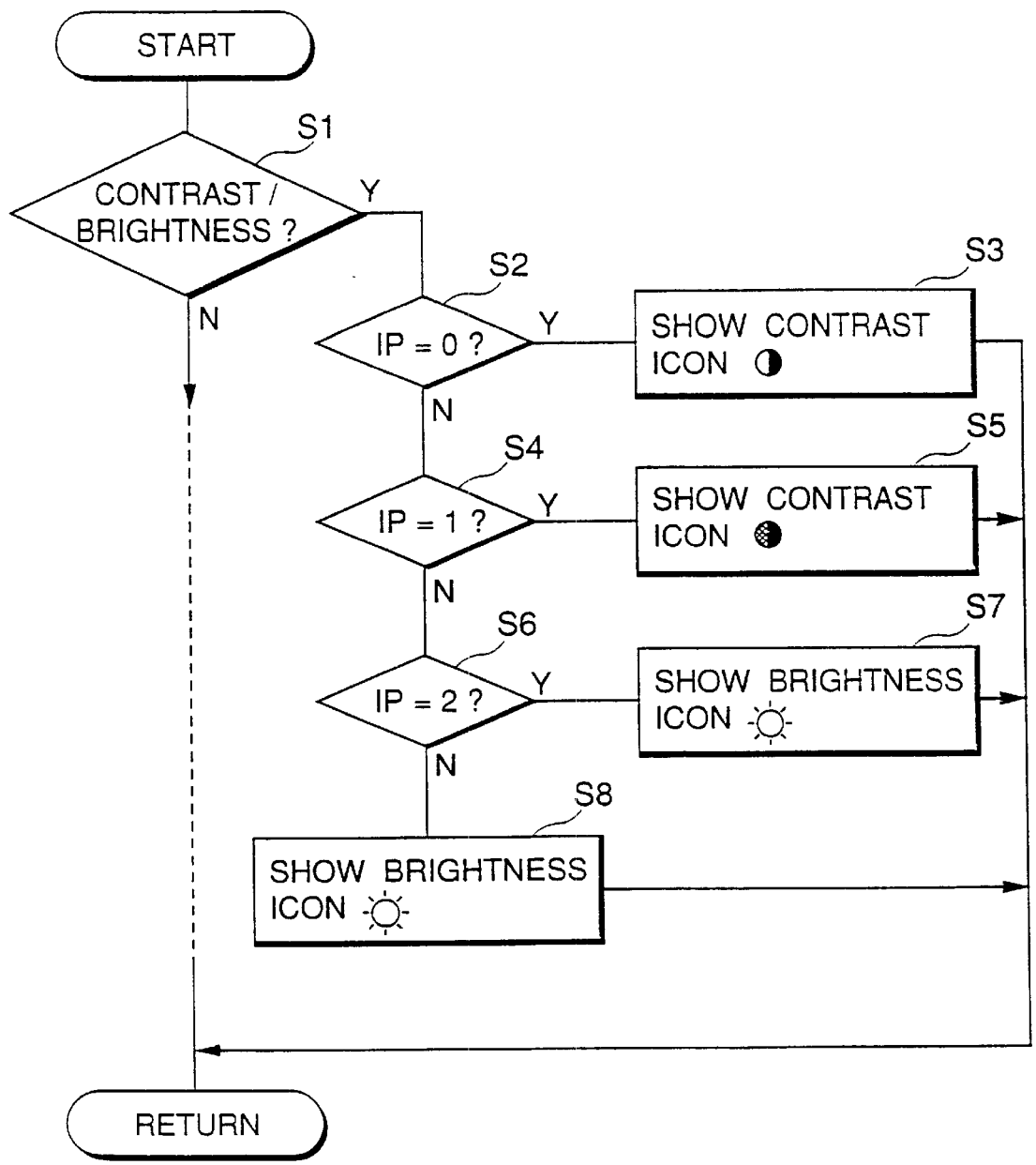
FIG. 10 is a flowchart showing a time-division icon display processing routine.

Since a time-division flag is set in Step S8 of FIG. 7 in this operation, the time-division icon display processing routine is repeatedly executed in the timer interrupt routine of FIG. 5 (Steps S4 and S5). As a result, the time-division icon display processing routine shown in FIG. 10 can sequentially switch and display different icons for a currently selected adjustment item within the submenu window as the icon pattern is cyclically updated by the timer interrupt routine from IP=0 to IP=3 (Step S1 to Step S8; see FIG. 14).

For example, if the selected adjustment item is "Contrast/Brightness" represented by icon i10, all icons that belong to this adjustment item are cyclically switched and displayed at the same icon position at 0.5-second intervals in the order of IP=0, 1, 2, and 3, as shown in row No. 1 of FIG. 14. Icons for the other adjustment items are also cycled in a similar way.

It is to be noted, however, that some parameters that can potentially be combined with other parameters are listed more than once in FIG. 14. The parameters appearing more than once in FIG. 14 may be used only once in the present adjustment system. For example, the adjustment items shown in row Nos. 4 and 5 are not necessary when the items in row Nos. 2 and 3 are adopted in the adjustment system. Also, the items in row Nos. 8 and 9 are not necessary when the items in row Nos. 6 and 7 are adopted.

When the operator specifies the adjustment item "Contrast/Brightness" and presses the input confirmation switch SWb, the input confirmation switch processing routine is initiated, where Steps S1 and S6 through S8 of FIG. 9 are executed. In Step S8, it is verified that the input confirmation switch SWb is not currently pressed. Then, the adjustment item "Contrast/Brightness" is selected and a message display request is issued (Step S10). If the input confirmation switch SWb is pressed in Step S8, the main menu window is resumed and icon i1 is shown in an inverted video.

When the OSD processing routine proceeds to the adjustment mode (Steps S1, S2 and S5 of FIG. 7), it initiates an adjustment window display processing routine (Step S9), resets the time-division flag (Step S10), and terminates the time-division icon display processing routine (Steps S4 and S5 of FIG. 5).

Figure 11:
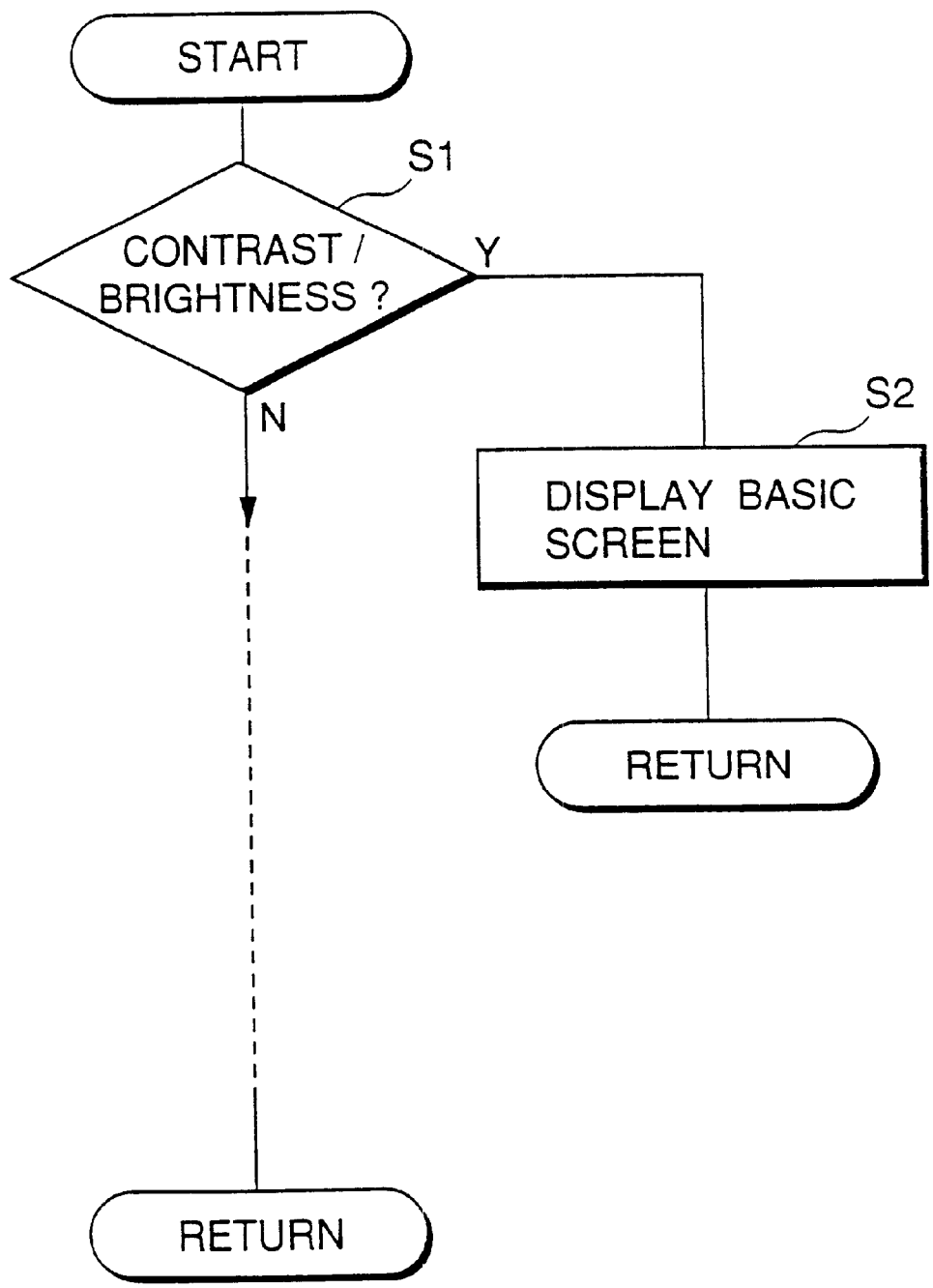
FIG. 11 is a flowchart showing an adjustment window display processing routine.

As shown in FIG. 11, the adjustment window display processing routine displays an adjustment window corresponding to the currently selected adjustment item on the screen of the CRT M1a (Steps S1 and S2).

Details of the adjustment window display operation are now described.

Corresponding to Figure numbers noted in remarks in FIG. 14, FIGS. 15A to 15H show adjustment windows which will be displayed for the individual adjustment items.

Figure 12:
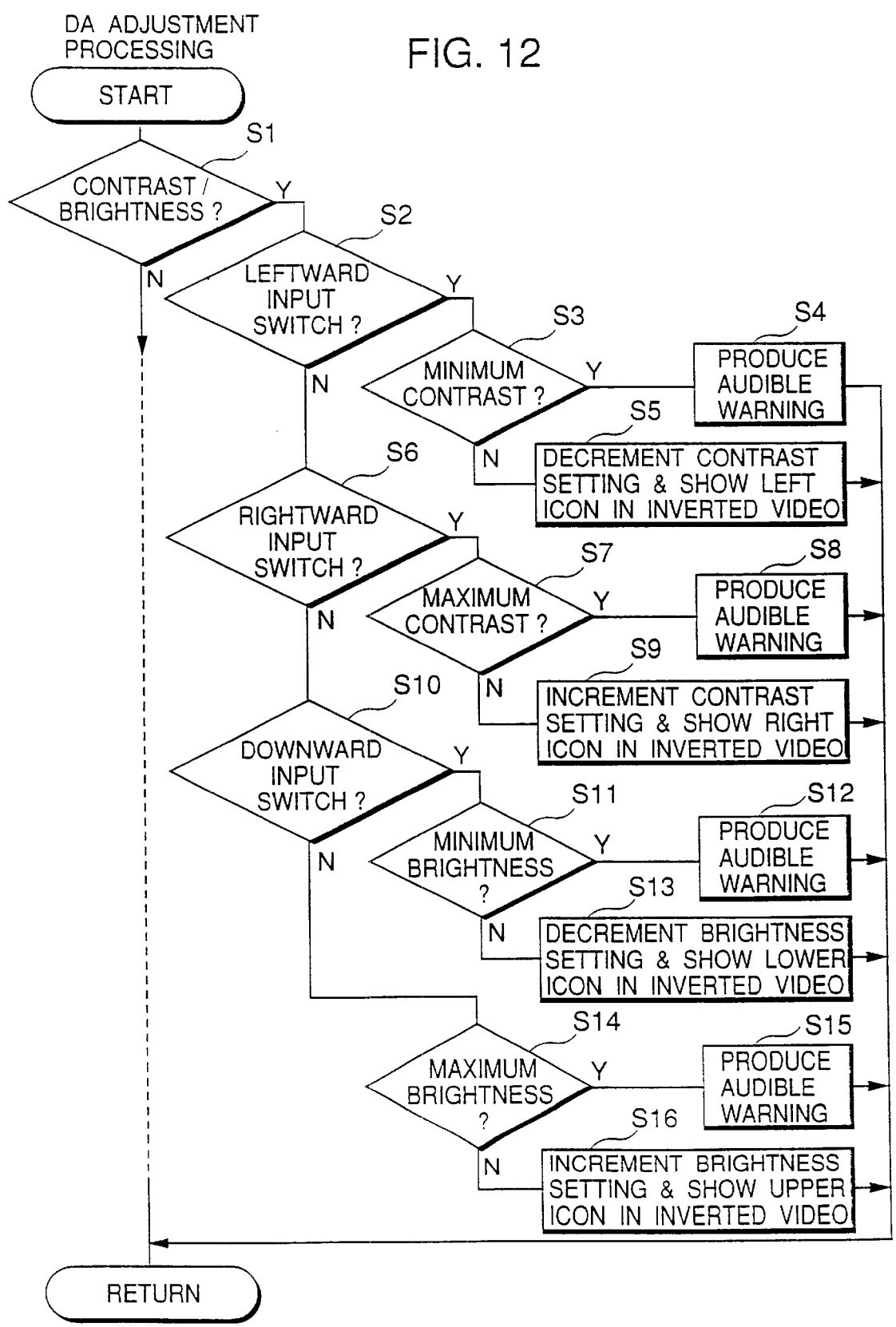
FIG. 12 is a flowchart showing a DA adjustment processing routine.

When any one of the directional input switches SWa is pressed while one of the adjustment windows shown in FIGS. 15A to 15H is displayed, the switch processing routine of FIG. 6 commences and a DA adjustment processing routine is initiated (Steps S1, and S5 through S7). What can be performed in the DA adjustment processing routine is, as shown in FIG. 12, to increment or decrement a parameter setting for contrast adjustment (Step S5 or S9), or increment or decrement a parameter setting for brightness adjustment (Step S13 or S16), depending on which directional input switch SWa is pressed (Step S2, S6 or S10), and output a new setting to the D/A converter 12. In this operation, contrast or brightness of the crosshatch pattern displayed on the CRT M1a for adjustment varies continuously.

In Steps S5, S9, S13 and S16, the DA adjustment processing routine shows one of icons, which are located at upper, lower, left and right positions within a relevant adjustment window, in an inverted video depending on which directional input switch SWa is pressed. This means that the DA adjustment processing routine makes it possible to increment or decrement two parameters at the same time and present adjustment results on one adjustment window. This is achieved by corresponding the upward, downward, leftward and rightward directional input switches SWa to a pair of parameters included in the adjustment items.

Figure 15A:
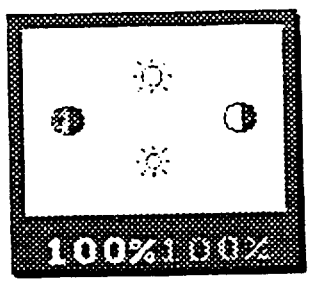
FIGS. 15A to 15H are diagrams showing examples of icons presented by direct selections.
Figure 15B:
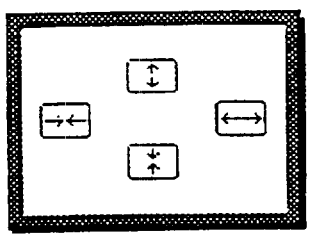
Figure 15C:
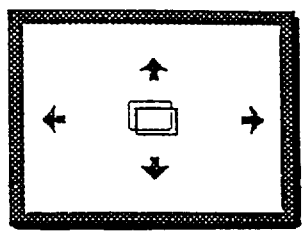
Figure 15D:
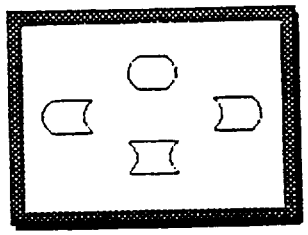
Figure 15E:
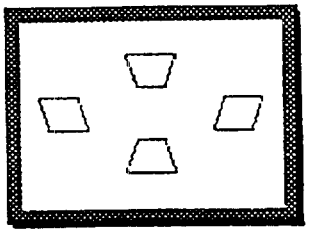
Figure 15F:
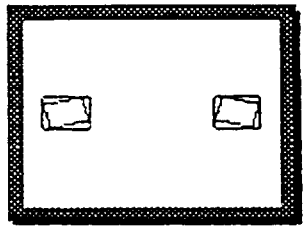
Figure 15G:
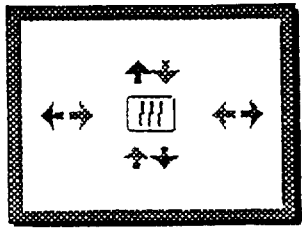
Figure 15H:
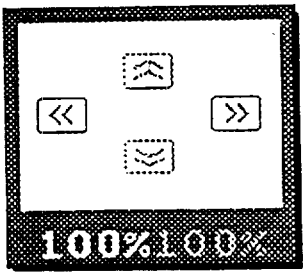

The adjustment windows for "Contrast/Brightness" of FIG. 15A and "Horizontal Moire Correction/Vertical Moire Correction" of FIG. 15H individually show current parameter settings at the bottom of each window. On-screen readouts of these settings may be updated the moment an altered parameter setting is transmitted to the D/A converter 12 in Step S5, S9, S13 or S16 of FIG. 12.

Since the adjustment windows for "Tilt" shown in FIG. 15F corresponds to just a single parameter, a practical arrangement would be, for instance, to disable the upward and downward directional input switches SWa while leaving the leftward and rightward directional input switches SWa operative. When the setting of a parameter that can be incremented or decremented has reached an upper limit or a lower limit, the corresponding directional input switch SWa is disabled (Steps S3 to S4, Steps S7 to S8, Steps S11 to S12, and Steps S14 to S15 of FIG. 12).

When the operator presses the input confirmation switch SWb after completing the adjustment of "Contrast/Brightness" in the above-described manner, the input confirmation switch processing routine commences by way of Steps S1, S2 and S4 of the switch processing routine shown in FIG. 6. The input confirmation switch processing routine executes Steps S1 and S6 through S9 of FIG. 9, where new contrast and brightness settings are stored in a nonvolatile memory of the microprocessor 11, the adjustment mode is canceled, and the submenu window (FIG. 13B) is re-presented on the screen.

Thereafter, the operator can select the other adjustment items one after another by pressing one of the directional input switches SWa and complete adjustment operation for the selected items. If the operator selects icon i7 (which corresponds to a return key) on the submenu window and presses the input confirmation switch SWb, the submenu window disappears and the main menu is re-presented (Steps S11 and S12 of FIG. 9). Then, the operator can select other icons than icon i1, that is, icons i2 to i7, provided by the adjustment system.

According to the adjustment system of the embodiment, it is also possible to directly select a specific adjustment item by pressing an separate operating switch, which is not illustrated, without going through the main menu and submenu windows. As an example, there may be provided an independent operating switch which enables direct selection of the adjustment item "Contrast/Brightness", as this item would be used so frequently. With this arrangement, it is possible to directly present the adjustment window shown in FIG. 15A and enter adjustment mode with a single press of the independent operating switch. "Contrast/Brightness" adjustment mode directly activated as described above is canceled when the independent operating switch is re-pressed. Adjustment modes which should preferably be called out directly may include, in addition to "Contrast/Brightness", those adjustment items which need to be adjusted at relatively a high frequency.

As described above, the main menu window shown in FIG. 13A includes, in addition to icon i1 corresponding to "Image Adjustment," icons i2 to i7 which can be selected in an arbitrary manner. For example, icon i2 corresponds to each adjustment of color temperature, gain settings for red, blue and green, and cut-off points for red, blue and green, while icon i3 corresponds to each operation such as degaussing, input terminal selection for the video signal Sv, activation or deactivation of audible warnings, on-screen positioning of adjustment windows, and so forth. While the directional input switches SWa and the input confirmation switch SWb are integrally incorporated into the one-piece operating switch panel SP in the above-described embodiment, the invention is not limited to this construction. As an alternative, there may be provided a common operating switch for entering commands for four directions and another operating switch for confirmation of an input. This construction enables the operator to use his, or her, left hand to manipulate one operating switch and right hand to manipulate the other operating switch. Using both hands would increase operator efficiency in carrying out the aforementioned adjustment operation.

What is claimed is:

1. A video monitor adjustment system comprising:
   an on-screen display controller circuit configured to display a plurality of adjustment items as icons on a display screen of a video monitor;
   an input device including an operation member connected with a common operating switch panel, said common operating switch panel being configured to be moved in upward, downward, leftward and rightward directions to move the operation member in said upward, downward, leftward and rightward directions to provide corresponding switch outputs from directional input switches independently operated thereby; and
   an image quality controller connected to receive the corresponding switch outputs and configured to select an adjustment item icon based thereon and to then adjust image quality adjustment parameters of said video monitor in accordance with further received corresponding switch outputs.

2. A video monitor adjustment system as recited in claim 1, further comprising an input confirmation switch that is configured to be operated by the operation member being moved by the common operating switch panel.

3. A video monitor adjustment system as recited in claim 2, wherein said on-screen display controller circuit is further configured to display a simultaneous visual message indicating the meaning of each displayed icon.

4. A video monitor adjustment system as recited in claim 2, wherein said directional input switches are divided into two groups, one group including switches configured to provide inputs to the image quality controller as said further received corresponding switch outputs to increment or decrement the setting of two parameters, and the other group being disabled.

5. A video monitor adjustment system as recited in claim 1, further comprising another operating member configured to operate an input confirmation switch.

6. A video monitor adjustment system as recited in claim 5, wherein said on-screen display controller circuit is further configured to display a simultaneous visual message indicating the meaning of each displayed icon.

7. A video monitor adjustment system as recited in claim 5, wherein said directional input switches are divided into two groups, one group including switches configured to provide inputs to the image quality controller as said further received corresponding switch outputs to increment or decrement the setting of two parameters, and the other group being disabled.

8. A video monitor adjustment system as recited in claim 1, wherein said on-screen display controller circuit is further configured to display a simultaneous visual message indicating the meaning of each displayed icon.

9. A video monitor adjustment system as recited in claim 8, wherein said directional input switches are divided into two groups, one group including switches configured to provide inputs to the image quality controller as said further received corresponding switch outputs to increment or decrement the setting of two parameters, and the other group being disabled.

10. The video monitor adjustment system as recited in claim 1, wherein said directional input switches are divided into two groups, one group including switches configured to provide inputs to the image quality controller as said further received corresponding switch outputs to increment or decrement the setting of two parameters, and the other group being disabled.

11. A video monitor adjustment system as recited in claim 10, wherein said image quality controller is further configured to cause said on-screen display controller circuit to display a plurality of icons used for parameter setting based on a time-division scheme.

12. A video monitor adjustment system as recited in claim 10, wherein said image quality controller is further configured to display a plurality of icons used for parameter setting all together for each adjustment item.

13. A video monitor adjustment system as recited in claim 1, wherein the operation member comprises a moveable shaft connected to said common operating switch panel to independently operate said directional input switches.

14. A video monitor adjustment system comprising:

an on-screen display controller circuit configured to display a plurality of adjustment items as icons that provide pictorial information representative of the corresponding adjustment items on a display screen of a video monitor;

an input device including an operating element configured to move in upward, downward, leftward and rightward directions to independently operate corresponding directional input switches to provide directional switch outputs and to operate an input confirmation switch integrally incorporated therewith; and an image quality controller configured to identify a selected adjustment item icon based upon said directional switch outputs and to adjust image quality adjustment parameters of said video monitor in accordance with a parameter setting operation in which two directional switch outputs are used by the image quality controller to increment and decrement a setting of two corresponding parameters, said image quality controller being further configured to control the display of a plurality of icons used for parameter setting all together for each adjustment item, the icons displayed together individually corresponding in position to corresponding positions of said directional input switches, an icon selected from the icons displayed together being emphasized in appearance for ease of identification.

15. A video monitor adjustment system comprising:

an on-screen display controller circuit configured to display a plurality of adjustment items as icons on a display screen of a video monitor;

an input device including directional input switches configured to specify four individual direction indicating outputs based upon an operating member thereof moving in each of an upward, downward, leftward and rightward direction in accordance with corresponding movement of an operation member by a common operating switch panel;

an input confirmation switch configured to provide a confirmation output; and an image quality controller configured to receive the four individual direction indicating outputs to select an adjustment item icon and to set image quality adjustment parameters of said video monitor in accordance with a parameter setting operation further using the confirmation output to confirm the setting of the image quality adjustment parameters, said image quality controller being further configured to control the providing of a plurality of adjustment icons, with each adjustment icon position corresponding to a respective direction of one of said directional input switches, and each adjustment icon being used for adjusting parameters for each adjustment item.

16. A video monitor adjustment system, comprising:

an on-screen display controller circuit configured to display a plurality of adjustment items as icons on a display screen of a video monitor, each of said icons having a pictorial information representing an image quality adjustment parameter;

an input device including an operation member configured to move in upward, downward, leftward, and rightward directions to provide corresponding directional switch outputs from directional input switches activated thereby and an input confirmation switch integrally incorporated with the operation member and configured to respond to an independent movement direction of said operation member not corresponding to said upward, downward, leftward and rightward directions to provide a confirmation output; and an image quality controller configured to receive the corresponding directional switch outputs and the confirmation output and to use the directional switch outputs to identify a selected adjustment item icon and to then adjust corresponding image quality adjustment parameters of said video monitor.

17. A video monitor adjustment system comprising:

an on-screen display controller circuit configured to display a plurality of adjustment items as icons on a display screen of a video monitor, each of said icons having a pictorial information representing an image quality adjustment parameter;

an input device including an operation member configured to move in upward, downward, leftward, and rightward directions to provide corresponding directional switch outputs from directional input switches operated thereby and an input confirmation switch integrally incorporated with the operation member and configured to provide a confirmation output; and an image quality controller configured to receive the directional switch outputs and the confirmation output and to use said corresponding directional switch outputs to select one of plural icons displayed at top, bottom, left and right positions on the display screen and to then set image quality adjustment parameters of said video monitor.

18. A video monitor adjustment system comprising:

an on-screen display controller circuit configured to display a plurality of adjustment items as icons on a display screen of a video monitor, each of said icons having a pictorial information representing an image quality adjustment parameter;

an input device including an operation member configured to move in upward, downward, leftward, and rightward directions to provide corresponding directional switch outputs from directional input switches operated thereby, and an input confirmation switch configured to respond to an independent movement direction of the operation member not corresponding to said upward, downward, leftward and rightward directions to provide a confirmation output; and an image quality controller configured to receive the directional outputs and the confirmation output and to use said corresponding directional switch outputs to select one of plural icons displayed at top, bottom, left and right positions on the display screen and to then set image quality adjustment parameters of said video monitor.

* * * * *